US011222540B2

(12) United States Patent
Kim et al.

(10) Patent No.: US 11,222,540 B2
(45) Date of Patent: Jan. 11, 2022

(54) VEHICLE AND METHOD OF CONTROLLING THE SAME

(71) Applicants: HYUNDAI MOTOR COMPANY, Seoul (KR); KIA MOTORS CORPORATION, Seoul (KR); Hyundai Autron Co., Ltd., Seongnam-si (KR)

(72) Inventors: SungYun Kim, Seoul (KR); Hyun-Woo Kim, Yongin-si (KR); Jun-Muk Lee, Seongnam-si (KR); Changwoo Ha, Seoul (KR)

(73) Assignees: HYUNDAI MOTOR COMPANY, Seoul (KR); KIA MOTORS CORPORATION, Seoul (KR); HYUNDAI AUTOEVER CORP., Seoul (KR)

( * ) Notice: Subject to any disclaimer, the term of this patent is extended or adjusted under 35 U.S.C. 154(b) by 258 days.

(21) Appl. No.: 16/555,918

(22) Filed: Aug. 29, 2019

(65) Prior Publication Data

US 2020/0211393 A1 Jul. 2, 2020

(30) Foreign Application Priority Data

Dec. 28, 2018 (KR) .......................... 10-2018-0171756

(51) Int. Cl.
*G08G 1/16* (2006.01)
*G05D 1/00* (2006.01)
(Continued)

(52) U.S. Cl.
CPC ........... *G08G 1/163* (2013.01); *G05D 1/0088* (2013.01); *G07C 5/08* (2013.01); *G08G 1/162* (2013.01);
(Continued)

(58) Field of Classification Search
CPC ........ G08G 1/163; G08G 1/162; G08G 1/166; G08G 1/096791; G08G 1/09675; G08G 1/096716; G08G 1/22; G05D 1/0088; G05D 2201/0213; G07C 5/08; G07C 5/008; G07C 5/0808; G01S 2013/9325;
(Continued)

(56) References Cited

U.S. PATENT DOCUMENTS

2002/0099481 A1\* 7/2002 Mori ...................... G05D 1/027
701/23

FOREIGN PATENT DOCUMENTS

KR 1020170068059 6/2017

\* cited by examiner

*Primary Examiner* — Michael V Kerrigan
(74) *Attorney, Agent, or Firm* — Lempia Summerfield Katz LLC

(57) ABSTRACT

A vehicle and a control method thereof are capable of performing autonomous navigation by diagnosing a failure of the vehicle and a neighboring vehicle on the basis of position information derived by the vehicle and the neighboring vehicle. The vehicle includes a sensor unit, a communication unit configured to communicate with a neighboring vehicle, and a control unit. The control unit is configured to determine first position information of the vehicle on the basis of information acquired by the sensor unit, receive second position information of the vehicle determined by the neighboring vehicle, and determine that at least one of the vehicle or the neighboring vehicle is in a failure state when a difference between the first position information and the second position information exceeds a reference value.

17 Claims, 8 Drawing Sheets

(51) Int. Cl.
*G07C 5/08* (2006.01)
*G08G 1/00* (2006.01)

(52) U.S. Cl.
CPC ............... *G08G 1/166* (2013.01); *G08G 1/22* (2013.01); *G05D 2201/0213* (2013.01)

(58) Field of Classification Search
CPC ........... G01S 2013/9316; G01S 13/931; G01S 19/396; G01S 19/14; B60W 50/0205; B60W 2556/65; B60W 2554/80; B60W 30/18; B60W 30/08; B60W 40/00; B60W 50/02; B60W 30/14; B60W 40/02; B60Q 9/008; B60Y 2306/15; B60Y 2300/08
See application file for complete search history.

FIG. 3A

|  | POSITION INFORMATION | EXPECTED POSITION INFORMATION BASE VALUE | EXPECTED POSITION INFORMATION DERIVED VALUE |
| --- | --- | --- | --- |
| FIRST VEHICLE | P1(X1, Y1, H1) | P2, P3 | F1(XE1, YE1, HE1) |
| SECOND VEHICLE | P2(X2, Y2, H2) | P1, P3 | F2(XE2, YE2, HE2) |
| THIRD VEHICLE | P3(X2, Y2, H2) | P1, P2 | F3(XE2, YE2, HE2) |

FIG. 3B

| DETERMINED TO BE FAILURE | CONDITION |
|---|---|
| FIRST VEHICLE | $(F1-P1)^2 > R$ |
| SECOND VEHICLE | $(F2-P2)^2 > R$ |
| THIRD VEHICLE | $(F3-P3)^2 > R$ |

VEHICLE AND METHOD OF CONTROLLING THE SAME

CROSS-REFERENCE TO RELATED APPLICATION

This application is based on and claims priority under 35 U.S.C. § 119 to Korean Patent Application No. 10-2018-0171756, filed on Dec. 28, 2018 in the Korean Intellectual Property Office, the disclosure of which is incorporated herein by reference.

BACKGROUND

1. Field

The present disclosure relates to a vehicle capable of performing autonomous navigation by diagnosing a failure of the vehicle and a neighboring vehicle, and a method of controlling the same.

2. Description of the Related Art

Autonomous navigation technology for a vehicle is a technique in which a vehicle is automatically self-driven by identifying the condition of a road without a driver's input or control, i.e., a driver does not have to control a brake, a steering wheel, an accelerator pedal, and the like.

Autonomous navigation technology is a core technology for implementing smart cars. Referring to an autonomous navigation vehicle, the autonomous navigation technology includes a highway driving support system (HAD) for automatically maintaining the distance between vehicles, a blind spot detection (BSD) for sensing a neighboring vehicle during backward driving and producing an alert, an automatic emergency braking (AEB) for operating a braking apparatus in case of a failure to recognize a preceding vehicle, a lane departure warning system (LDWS), a lane keeping assist system (LKAS), for preventing drift out of a lane without a turn signal, an advanced smart cruise control (ASCO) for performing auto cruise at a designated speed while maintaining a distance between vehicles, a traffic jam assistant (TJA) system, and the like.

When performing autonomous navigation, there is a need to diagnose a failure of a moving vehicle. The diagnosis of the failure is necessary because, in response to an abnormality detected in the moving vehicle, a follow-up measure, such as transferring control, is required.

SUMMARY

There is a need to diagnose a failure of a neighboring vehicle, i.e., another vehicle positioned surrounding, nearby, or in the vicinity of the vehicle, or the like, when the vehicle is moving. The diagnosis of the failure of the neighboring vehicle is necessary because, in response to a failure of a neighboring vehicle, a follow-up measure, such as avoiding the neighboring vehicle, is required to prevent an accident.

The technology of determining a failure of a neighboring vehicle has not been sufficiently studied and developed in comparison to the technology of determining a failure of a subject vehicle.

Therefore, it is an object of the present disclosure to provide a vehicle capable of travelling safely by diagnosing a failure of a vehicle and a neighboring vehicle on the basis of position information derived by the vehicle and the neighboring vehicle, and a method of controlling the same.

Additional aspects of the disclosure are set forth in part in the description which follows and, in part, can be understood from the description, or may be learned by practice of the disclosure.

Therefore, it is an aspect of the present disclosure to provide a vehicle that includes a sensor unit, a communication unit configured to communicate with a neighboring vehicle, and a control unit. The control unit is configured to determine first position information of the vehicle on the basis of information acquired by the sensor unit, to receive second position information of the vehicle determined by the neighboring vehicle, and to determine that at least one of the vehicle or the neighboring vehicle is in a failure state when a difference between the first position information and the second position information exceeds a first reference value.

The communication unit may be configured to communicate with the neighboring vehicle and with another neighboring vehicle.

The control unit may be configured to: receive third position information of the vehicle determined by the other neighboring vehicle; determine expected position information of the vehicle on the basis of the second position information and the third position information; and determine the vehicle to be in a failure state when a difference between the expected position information and the first position information exceeds a second reference value.

The control unit may determine expected position information of the vehicle on the basis of the first position information and the third position information and may determine that the neighboring vehicle is in a failure state when a difference between the expected position information and the second position information of the vehicle exceeds a third reference value.

The sensor unit may include a plurality of sensor modules. The control unit may determine the first position information on the basis of pieces of information acquired by the plurality of sensor modules, respectively, and may determine a failure state of at least one of the plurality of sensor modules on the basis of the difference between the first position information and the second position information.

The control unit may change the first reference value on the basis of a reception strength of the communication unit and an operation state of the sensor unit.

It is an aspect of the present disclosure to provide a method of controlling a vehicle. The method of controlling the vehicle includes communicating with a neighboring vehicle, determining first position information of the vehicle on the basis of information acquired by a sensor unit, receiving second position information of the vehicle determined by the neighboring vehicle, and determining that at least one of the vehicle or the neighboring vehicle is in a failure state when a difference between the first position information and the second position information exceeds a first reference value.

The method may further include communicating with the neighboring vehicle and with another neighboring vehicle.

The method may further include receiving third position information of the vehicle determined by the other neighboring vehicle. The method may also include determining expected position information of the vehicle on the basis of the second position information and the third position information. The method may further include determining that the vehicle is in a failure state when a difference between the expected position information and the first position information exceeds a second reference value.

The determining that the vehicle is in a failure state includes: receiving third position information of the vehicle determined by the other neighboring vehicle; determining expected position information of the vehicle on the basis of the second position information and the third position information; and determining the vehicle to be in a failure state when a difference between the expected position information and the first position information exceeds a second reference value.

The determining that the vehicle is in a failure state includes determining expected position information of the vehicle on the basis of the first position information and the third position information. The determining that the vehicle is in a failure state further includes determining that the neighboring vehicle is in a failure state when a difference between the expected position information and the second position information of the vehicle exceeds a third reference value.

The sensor unit may include a plurality of sensor modules.

The determining that at least one of the vehicle or the neighboring vehicle is in a failure state may include determining the first position information on the basis of pieces of information acquired by the plurality of sensor modules, respectively, and may include determining a failure state of at least one of the plurality of sensor modules on the basis of the difference between the first position information and the second position information.

The method may further include changing the first reference value on the basis of a reception strength of the communication unit and an operation state of the sensor unit.

In another aspect of the present disclosure, a vehicle includes a sensor unit, a processor and a computer-readable medium. The computer-readable medium contains computer-executable instructions that, when executed by the vehicle, cause the processor to communicate with a neighboring vehicle. The processor may further determine first position information of the vehicle on the basis of information acquired by the sensor unit. The processor may also receive second position information of the vehicle determined by the neighboring vehicle. The processor may determine that at least one of the vehicle or the neighboring vehicle is in a failure state when a difference between the first position information and the second position information exceeds a first reference value.

BRIEF DESCRIPTION OF THE DRAWINGS

These and/or other aspects of the disclosure will become apparent and more readily appreciated from the following description of the embodiments, taken in conjunction with the accompanying drawings of which:

FIGS. 3A and 3B are diagrams for describing an operation of determining a failure state according to an embodiment;

DETAILED DESCRIPTION

Figure 1:
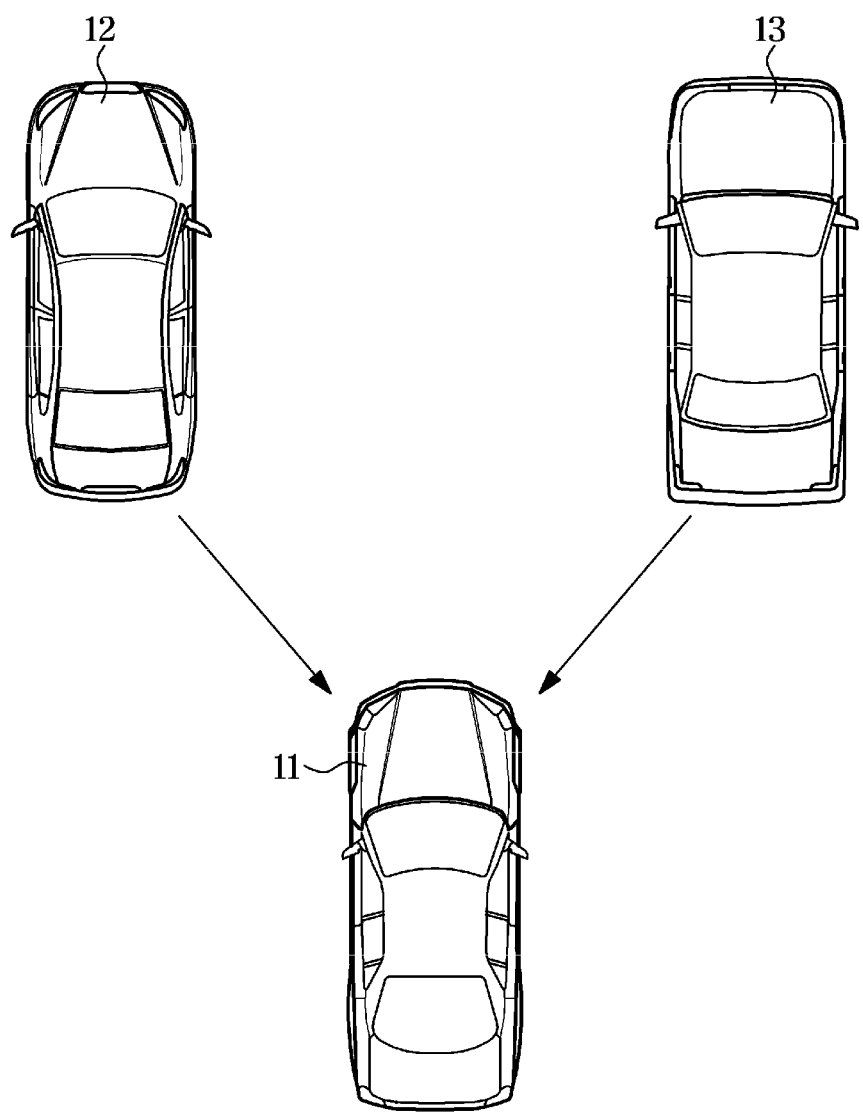
FIG. 1 is a diagram illustrating a relationship between a vehicle and a neighboring vehicle.

Like numerals refer to like elements throughout the specification. Not all elements of embodiments of the present disclosure are described. A description of what are commonly known in the art or what overlap each other in the embodiments is omitted. The terms as used throughout the specification, such as "~part", "~module", "~member", "~block", and the like, may be implemented in software and/or hardware. A plurality of "~parts", "~modules", "~members", or "~blocks" may be implemented in a single element, or a single "~part", "~module", "~member", or "~block" or may include a plurality of elements.

It should be further understood that the term "connect" or its derivatives refer both to direct and indirect connection. The indirect connection includes a connection over a wireless communication network.

It should be further understood that the terms "comprises" and/or "comprising," when used in this specification, identify the presence of stated features, integers, steps, operations, elements, and/or components, but do not preclude the presence or addition of one or more other features, integers, steps, operations, elements, components, and/or groups thereof, unless the context clearly indicates otherwise.

In the specification, it should be understood that, when a member is referred to as being "on/under" another member, it can be directly on/under the other member, or one or more intervening members may also be present.

The terms including ordinal numbers like "first" and "second" may be used to explain various components, but the components are not limited by the terms. The terms are only for the purpose of distinguishing a component from another.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise. Hereinafter, the operating principles and embodiments of the disclosure are described below with reference to the accompanying drawings.

FIG. 1 is a diagram illustrating a relationship between a vehicle and a neighboring vehicle.

Referring to FIG. 1, a vehicle 11 may communicate with neighboring vehicles 12 and 13.

The vehicle 11 may derive or determine vehicle position information on the basis of a sensor provided in the vehicle 11. In addition, the neighboring vehicles 12 and 13 may derive or determine vehicle position information using sensors provided in the neighboring vehicles 12 and 13, respectively.

In detail, the vehicle 11 may determine position information (x, y, h) of the vehicle position by applying information recognized through a sensor (global positioning system (GPS), radar, camera, lidar, and the like) to an extended Kalman filter. In addition, the vehicles 12 and 13 may determine vehicle position information (x1, y1, h1, x2, y2, h2, and x3, y3, h3) using a relative positioning method. Meanwhile, the vehicle 11 may receive the vehicle position information determined by the neighboring vehicles 12 and 13 through a vehicle-to-vehicle (V2V) communication.

V2V may refer to a vehicle-to-vehicle communication. V2V may refer to technology in which vehicles exchange information therebetween using network, communication, Internet technologies, and the like.

Figure 2:
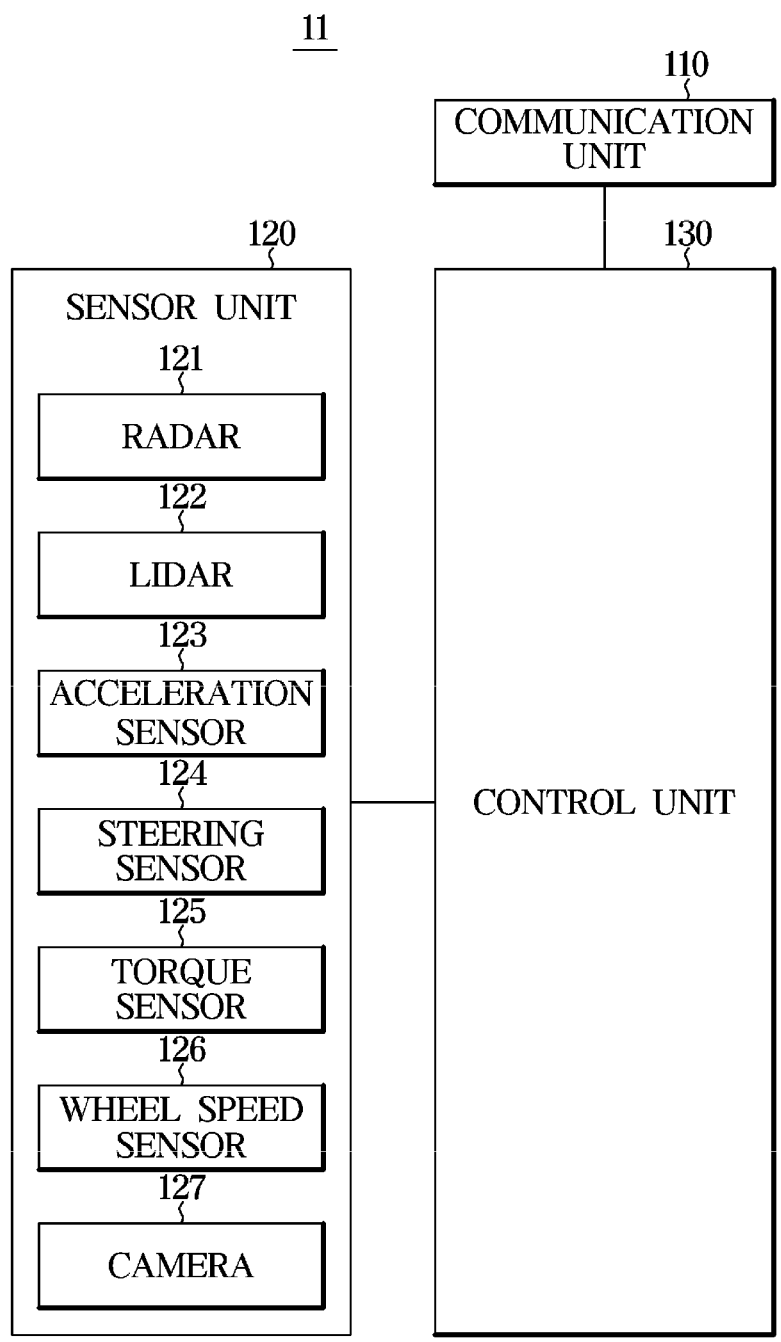
FIG. 2 is a control block diagram illustrating a vehicle according to an embodiment.

FIG. 2 is a control block diagram illustrating the vehicle 11 according to an embodiment.

Referring to FIG. 2, the vehicle 11 according to the embodiment may include a communication unit 110, a sensor unit 120, and a control unit 130.

The communication unit 110 may communicate with a neighboring vehicle. As described above, the communication unit 110 may perform a V2V communication with a neighboring vehicle.

The communication unit 110 may include one or more components that enable communication with an external device. For example, the communication unit 110 may include at least one of a short-range communication module, a wired communication module, a wireless communication module, and/or the like.

The short-range communication module may include various short-range communication modules that may transmit and receive signals in a short distance using a wireless communication network. For example, the short-range communication module may include a Bluetooth module, an infrared communication module, a radio frequency identification (RFID) communication module, a wireless local access network (WLAN) communication module, a near field communication (NFC) communication module, a Zigbee communication module, and the like.

The wired communication module may include not only various wired communication modules, such as a controller area network (CAN) communication module, a local area network (LAN) communication module, a wide area network (WAN) module, or a value added network (VAN) module, but may also include various cable communication modules, such as a universal serial bus (USB), a high definition multimedia interface (HDMI), a digital visual interface (DVI), a recommended standard 232 (RS-232), power line communication, or plain old telephone service (POTS).

The wireless communication module may include various wireless communication modules for supporting various wireless communication methods, such as a Wifi module, a wireless broadband (Wibro) module, a global system for mobile communication (GSM), a code division multiple access (CDMA), a wideband code division multiple access (WCDMA), universal mobile telecommunications system (UMTS), a time division multiple access (TDMA), a long term evolution (LTE), and the like.

The wireless communication module may include a wireless communication interface including an antenna and a transmitter for transmitting position information of a vehicle. In addition, the wireless communication module may further include a position information signal converting module for converting a digital control signal output from the control unit through the wireless communication interface into an analog type wireless signal under the control of the control unit.

The wireless communication module may include a wireless communication interface including an antenna and a receiver for receiving position information. In addition, the wireless communication module may further include a position information signal converting module for demodulating an analog type wireless signal received through the wireless communication interface into a digital control signal.

The sensor unit 120 may include a plurality of sensor modules. The sensor unit 120 may acquire information required to determine the position of the vehicle 11. In detail, the sensor unit 120 may acquire distances to other vehicles and objects positioned around the vehicle 11, i.e., an object or vehicle positioned surrounding, nearby, or in the vicinity of the vehicle 11, or the like.

The sensor unit 120 may include a radar 121, a lidar 122, an acceleration sensor 123, a steering sensor 124, a torque sensor 125, and a wheel speed sensor 126.

The radar 121 may be provided as a sensor module that emits electromagnetic waves in a range of microwaves (microwaves with a wavelength of about 10 cm (3.93 inch) to 100 cm (39.37 inch)) to an object, receives electromagnetic waves reflected from the object, and identifies the distance, direction, and altitude of the object with respect to the vehicle. According to an embodiment, a forward radar provided at a front side of a vehicle may be used to determine longitudinal direction related position information of the vehicle.

The lidar 122 may be provided as a sensor module that emits a laser pulse to a surrounding object and that receives the laser, upon being reflected from the surrounding object and returning thereto, to measure the distance to the object and the like so that the surrounding image is represented in detail.

The acceleration sensor 123 may be implemented using a three-axis sensor. The acceleration sensor 123 may be implemented to acquire acceleration information in the x-axis, y-axis, and z-axis directions when the vehicle 11 moves in three-dimensional space. The acceleration sensor 123 may be implemented using a gyro sensor. The sensor is not limited in type as long as it can calculate impact information of the vehicle 11.

The steering sensor 124 refers to a sensor that may acquire the angle at which a tire is actually rotated with respect to the turning angle of the steering wheel of the vehicle 11. The steering sensor 124 may be provided in an electric power steering (ESP) system.

The torque sensor 125 is a sensor that measures the overall torque of the vehicle 11. When the torque is measured, a power transmission shaft is coupled with a braking device and the work is dissipated in the form of heat or electric energy to produce a braking force, in which case the torque may be acquired from the braking force, or from a torsion angle or deformation of the power transmission shaft.

The wheel speed sensor 126 is installed in each of four wheels, including front and rear wheels, so that the rotational speed of the wheel may be detected by a change in magnetic force lines in a tone wheel and a sensor. According to an embodiment, the wheel speed sensor 126 may be provided in an electronic stability control (ESC) system.

The camera 127 may be provided on the front, rear, and lateral sides of the vehicle 11 to acquire images.

The camera 127 may include a charge-coupled device (CCD) camera or a complementary metal-oxide semiconductor (CMOS) color image sensor. In this embodiment, the CCD and the CMOS may refer to a sensor that converts light received through a lens of a camera into an electric signal. In detail, the CCD camera 127 refers to an apparatus that converts an image into an electric signal using a charge-coupled device. In addition, a CMOS image sensor (CIS) refers to a low-consumption and low-power type image pickup device having a CMOS structure, and serves as an electronic film of a digital device. In general, the CCD has a sensitivity superior than that of the CIS and thus is widely used in the vehicle 11, but the present disclosure is not limited thereto. According to an embodiment, a side camera provided on the vehicle may be used to determine lateral position information of the vehicle.

The control unit 130 may determine first position information of the vehicle 11 on the basis of information acquired by the sensor unit 120. In other words, the control unit 130 may determine position information of the vehicle 11 on the basis of the information acquired by the sensor unit 120. According to the present disclosure, position information derived by the vehicle 11, which is a subject vehicle, is referred to as the first position information.

In addition, a neighboring vehicle 12 of the vehicle 11 may determine second position information of the vehicle 11. The second position information may refer to position information of the vehicle 11 determined by the neighboring vehicle 12.

The vehicle 11 receives the second position information of the vehicle 11 determined by the neighboring vehicle 12. The vehicle 11 determines that at least one of the vehicle 11 or the neighboring vehicle 12 is in a failure state when the difference between the first position information and the second position information exceeds a first reference value. Detailed operations thereof are described below.

The control unit 130 may receive third position information of the vehicle 11 determined by another neighboring vehicle 13. The control unit 130 may determine expected position information of the vehicle 11 on the basis of the second position information and the third position information.

The third position information may refer to position information of the vehicle 11 derived by the other neighboring vehicle 13 which is distinguished from the neighboring vehicle 12.

Expected position information of a vehicle (a subject vehicle) may refer to position information derived on the basis of position information derived by vehicles except for position information derived by a subject vehicle.

In other words, expected position information of a vehicle which has derived first position information may be determined on the basis of second position information and third position information.

The control unit 130 may determine that the vehicle 11 is in a failure state when the difference between the expected position information of the vehicle 11 and the first position information exceeds a second reference value.

The control unit 130 may determine that position information determined on the basis of information acquired by other vehicles is relatively reliable. The control unit 130 may further determine that the position information derived by the vehicle 11 has an error when the difference between the position information determined on the basis of information acquired by other vehicles and position information derived by the vehicle 11 exceeds a reference value.

The control unit 130 may determine expected position information of the vehicle 12 on the basis of first position information and third position information. The control unit 130 may also determine the neighboring vehicle 12 to be in a failure state when the difference between the expected position information of the vehicle 12 and the second position information exceeds a third reference value. Referring to the reference values, a first reference value, a second reference value, a third reference value may have the same value or they may have different values.

When determining expected position information of a subject vehicle, a plurality of vehicles may be used. When the difference between position information of a certain subject vehicle determined by the certain subject vehicle and expected position information determined by other vehicles, except for the certain subject vehicle, is greater than the corresponding reference value, it is determined that the certain subject vehicle has wrongly derived the position thereof.

When the neighboring vehicle 12 derives second position information and the difference between expected position information derived by vehicles except for the neighboring vehicle 12 and the second position information exceeds a reference value, the control unit 130 may determine that the neighboring vehicle 12 is in a failure state.

The control unit 130 may determine the first position information on the basis of information acquired by each of the plurality of sensor modules. The control unit 130 may further determine a failure state of at least one of the plurality of sensor modules on the basis of the difference between the first position information and the second position information.

According to an embodiment, the position information may include longitudinal position information, lateral position information, and height position information.

When the vehicle 11 derives longitudinal position information through a radar provided in the vehicle 11, and the difference between the longitudinal position information included in the first position information and the longitudinal position information included in the second position information is greater than the corresponding reference value, the control unit 130 may determine that the radar used for deriving the longitudinal position information is in a failure state.

The control unit 130 may change the reference value on the basis of reception strength of the communication unit 110 and the operation state of the sensor unit 120.

For example, when the vehicle 11 travels in a region in which the reception strength of GPS signals received by the communication unit 110 is weak, the accuracy of position information of the vehicle 11 decreases, so that the reference value may be increased. Details thereof are described below.

The control unit 130 may include a memory (not shown) for storing data regarding an algorithm for controlling the operations of the components of the vehicle 11 or a program that represents the algorithm, and a processor of a computer (not shown) that performs the above described operations using the data stored in the memory. The memory and the processor may be implemented as separate chips. Alternatively, the memory and the processor may be implemented as a single chip.

At least one component may be added or omitted to correspond to the performances of the components of the system/apparatus shown in FIG. 2. In addition, the mutual positions of the components may be changed to correspond to the performance or structure of the system.

Some of the components shown in FIG. 2 may refer to a software component and/or a hardware component, such as a Field Programmable Gate Array (FPGA) and an Application Specific Integrated Circuit (ASIC).

FIGS. 3A and 3B are diagrams for describing an operation of determining a failure state according to an embodiment.

Referring to FIG. 3A, a relationship between position information derived by each vehicle and expected position information is illustrated.

A first vehicle in FIG. 3A may correspond to a subject vehicle, a second vehicle may correspond to a neighboring vehicle, and a third vehicle may correspond to another neighboring vehicle.

P1 may represent first position information, i.e., position information derived by the first vehicle. In addition, P1 may include longitudinal position information x1, lateral position information y1, and height position information h1 derived by the first vehicle.

P2 may represent second position information, i.e., position information derived by the second vehicle. In addition, P2 may include longitudinal position information x2, lateral position information y2, and height position information h2 derived by the second vehicle.

P3 may represent third position information, i.e., position information derived by the third vehicle. In addition, P3 may include longitudinal position information x3, lateral position information y3, and height position information h3 derived by the third vehicle.

In addition, the control unit 130 may derive expected position information that is used to determine the failure state of each vehicle.

In order to determine the failure state of the first vehicle, expected position information determined on the basis of the second position information and the third position information may be used.

In order to determine the failure state of the second vehicle, expected position information determined on the basis of the first position information and the third position information may be used.

In order to determine the failure state of the third vehicle, expected position information determined on the basis of the first position information and the second position information may be used.

The expected position information may also include longitudinal position information, lateral position information, and height position information.

In addition, an extended Kalman filter (EKF) may be used by the control unit 130 to derive the expected position information. The EKF may represent an optimal mathematical computation process in which a location after a certain period of time is predicted by analyzing existing observations using the method of least squares.

The EKF alleviates the assumption of linearity in the Kalman filter so that the use thereof is expanded to general systems.

In other words, the control unit 130 may input an expected position information base value into the EKF. The control unit 130 may further determine a resultant value as an expected position information derivation value.

Referring to FIG. 3B, when a square value of the difference between first position information and expected position information that is determined on the basis of second position information and third position information exceeds a reference value, the control unit 130 may determine the first vehicle to be in a failure state.

In detail, based on when the sum of differences between each of longitudinal position information, lateral position information, and height position information included in the first position information and a corresponding one of longitudinal position information, lateral position information, and height position information included in the expected position information exceeds a corresponding reference value, the failure state of the first vehicle may be determined.

According to an embodiment, when the square of the difference between the longitudinal position information included in the first position information and the longitudinal position information included in the expected position information exceeds a predetermined value, the control unit 130 may determine that the radar provided in the first vehicle and used to derive the longitudinal position information is in a failure state.

In this case, the control unit 130 of the first vehicle may control the first vehicle to travel on the basis of information acquired by the sensor unit of the first vehicle excluding the radar which is determined to be broken.

In addition, the control unit 130 may determine that the second vehicle is in a failure state when a square value of the difference between second position information and expected position information that is determined on the basis of first position information and third position information exceeds a reference value.

In this case, when the square of the difference between the lateral position information included in the second position information and the lateral position information included in the expected position information exceeds a predetermined value, the control unit 130 may determine that the side camera provided in the second vehicle and used to derive the lateral position information is in a failure state. In addition, when such a determination is performed by the control unit 130 of the first vehicle, the control unit 130 of the first vehicle may control the first vehicle to avoid the second vehicle.

In addition, the control unit 130 of the first vehicle may send the second vehicle a warning message indicating that the side camera of the second vehicle is in a failure state.

The operations shown in FIGS. 3A and 3B are merely an example for the purposes of describing the present disclosure. In particular, the operation of calculating the differences between each position information and expected position information is not limited to calculating the square value thereof, as long as it can derive the differences.

Figure 4A:
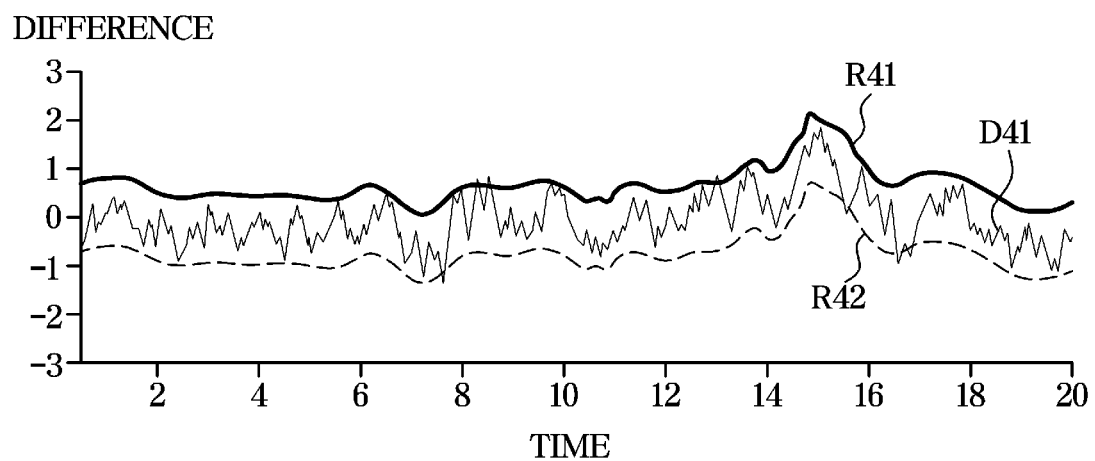
FIGS. 4A and 4B are diagrams for describing a relationship between a reference value and position information of a vehicle according to an embodiment.
Figure 4B:
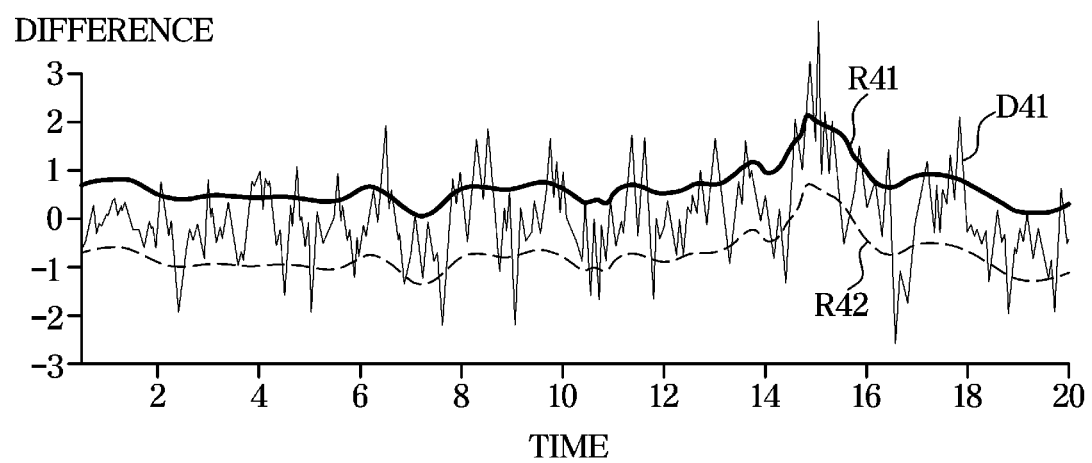

FIGS. 4A and 4B are diagrams for describing a relationship between a reference value and position information of a vehicle according to an embodiment.

Referring to FIG. 4A, R41 and R42 represent reference values.

In addition, D41 may represent a difference between position information derived by each vehicle and expected position information determined according to the above-described operation.

Referring to FIG. 4A, the difference between the position information and the expected position information does not exceed the reference value. When the difference between position information derived by a subject vehicle and position information derived by other vehicles is included in a predetermined range, the control unit 130 may determine that the reliability of a determined position of the vehicle is ensured and that the vehicle has no failure.

Referring to FIG. 4B, D41 may represent a difference between position information derived from the vehicle and expected position information.

Referring to FIG. 4B, the difference between the position information and the expected position information exceeds the reference value. When the difference between the position information derived by the subject vehicle and the position information derived by other vehicles is outside a predetermined range, the control unit 130 may determine that the reliability of a determined position of the vehicle is questionable. The control unit 130 may further determine that a failure has occurred in the vehicle.

The operation described with reference to FIGS. 4A and 4B is merely an example for the purposes of describing the operation of the present disclosure. The reference value and the difference between the position information and the expected position information are not limited thereto. In particular, the reference value may be changed on the basis of the operation described below.

Figure 5:
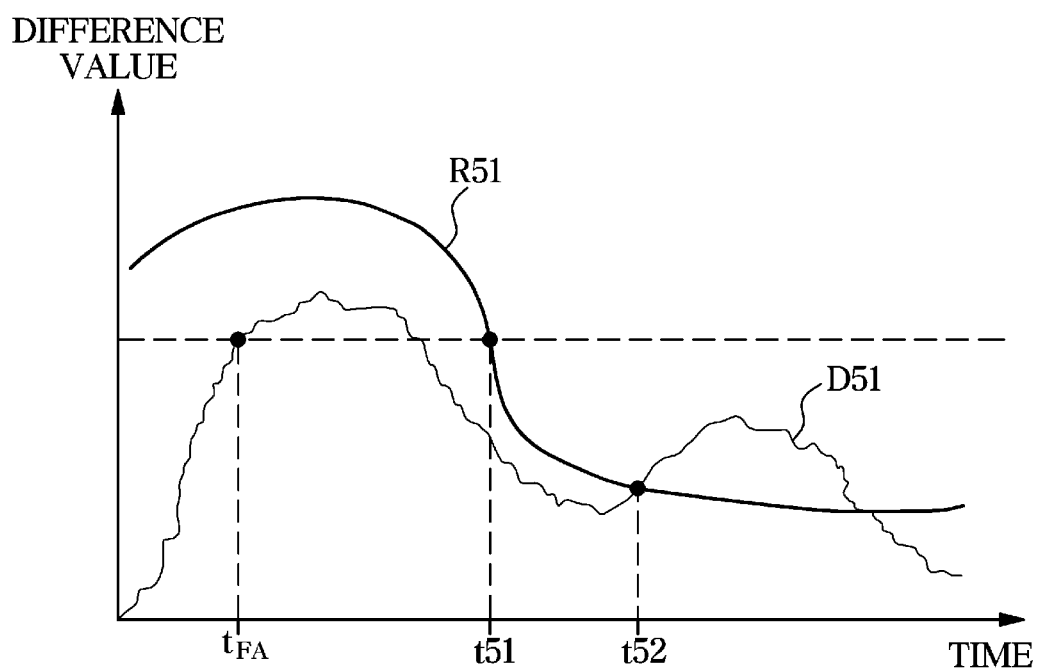
FIG. 5 is a diagram for describing an operation of changing a reference value according to an embodiment.

FIG. 5 is a diagram for describing an operation of changing a reference value according to an embodiment.

Referring to FIG. 5, a reference value R51 represents a difference D51 between position information derived by a vehicle and expected position information.

As described above, the reference value may be changed. In detail, under the circumstance where the sensor provided in the vehicle has a great performance, the control unit 130 may set the reference value to be low. For example, the control unit 130 may determine that the radar, the camera, and the lidar provided in the vehicle easily recognize surrounding objects when the vehicle travels in a clear weather.

In this case, the control unit 130 may determine that the sensor provided in the vehicle is in a failure state even when the difference between the position information and the expected position information is small. Accordingly, the control unit 130 may set the reference value to be low.

On the other hand, when the position information of the vehicle is not easily determined, for example, when the reception strength of the communication unit 110 is weak and GPS reception is difficult, the position information of the vehicle may have many errors, so that the vehicle may set the reference value to be high. Referring to FIG. 5, the reference value is set to be high before the time of t51 and to be low after the time of t51.

In addition, since the difference D51 between the position information derived from the vehicle and the estimated position information at the time of t52 exceeds a reference value R51, it is determined that the vehicle that has derived the position information is in a failure state.

Although the changing of the reference value has been described with reference to FIG. 5, it is merely an example for the purposes of describing the present disclosure. Factors for changing the reference value are not limited thereto.

Figure 6:
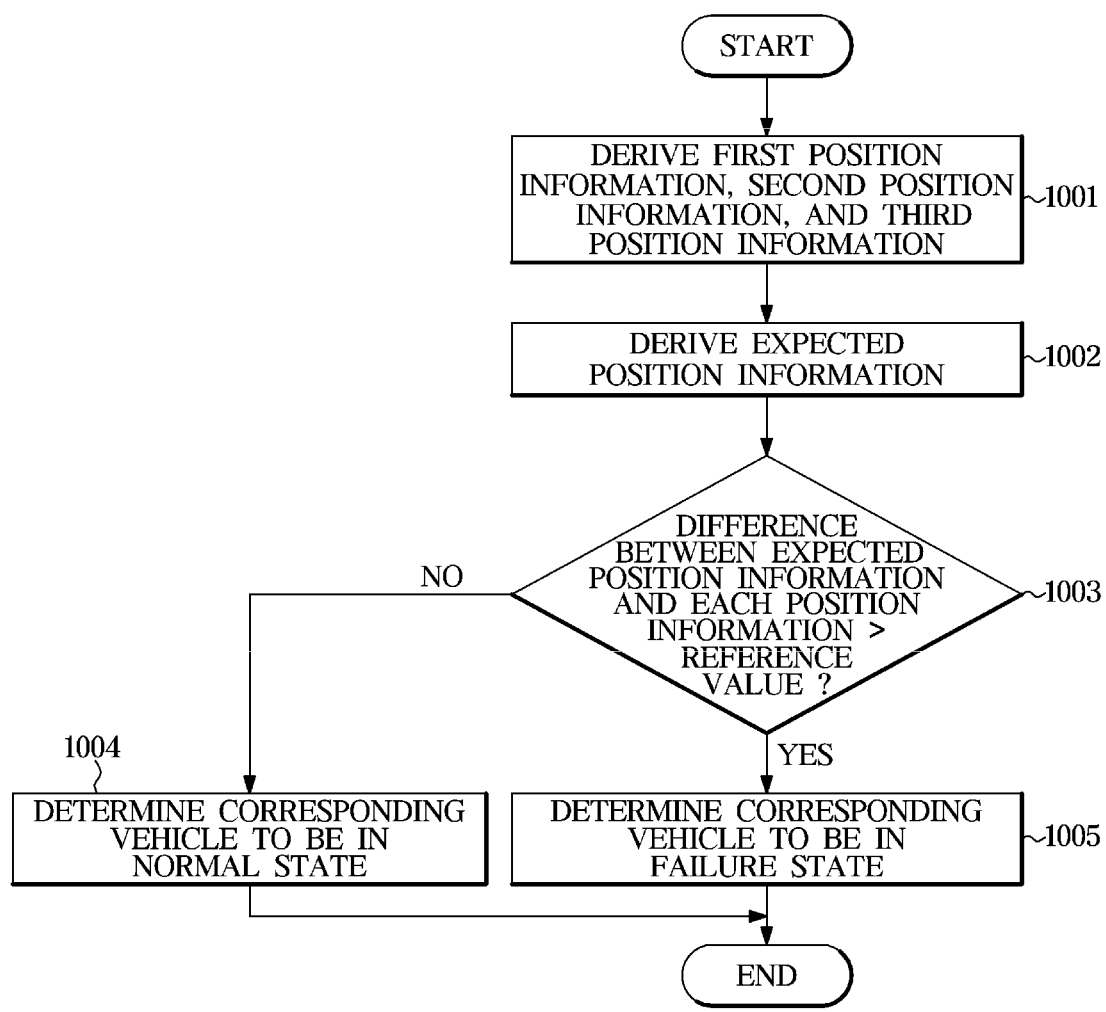
FIG. 6 is a flowchart according to an embodiment.

FIG. 6 is a flowchart according to an embodiment.

Referring to FIG. 6, vehicles may determine first position information, second position information, and third position information, each corresponds to position information of a subject vehicle (1001).

In addition, expected position information may be determined according to the above-described operation (1002).

When the difference between the position information and the estimated position information exceeds a reference value (1003), a certain vehicle having the position information may be determined to be in a failure state. The control unit may perform an operation of determining a failure of a sensor corresponding to a longitudinal direction, a lateral direction, or a height direction included in each position information on the basis of the information indicating the failure.

When the difference between the position information and the estimated position information is less than or equal to the reference value (1003), it may be determined that the vehicle having derived the position information is in a normal state.

The disclosed embodiments may be embodied in the form of a recording medium storing instructions executable by a computer. The instructions may be stored in the form of program code. When executed by a processor, the instructions may generate a program module to perform the operations of the disclosed embodiments. The recording medium may be embodied as a computer-readable recording medium.

The computer-readable recording medium includes all kinds of recording media in which instructions which can be decoded by a computer are stored, for example, a Read Only Memory (ROM), a Random Access Memory (RAM), a magnetic tape, a magnetic disk, a flash memory, an optical data storage device, and the like.

As is apparent from the description above, the vehicle and the method of controlling the same can perform safe travelling by diagnosing a failure of a vehicle and a neighboring vehicle on the basis of position information derived by the vehicle and the neighboring vehicle.

Although various embodiments of the present disclosure have been described for illustrative purposes, those of ordinary skill in the art will appreciate that various modifications, additions and substitutions are possible, without departing from the scope and spirit of the disclosure. Therefore, various embodiments of the present disclosure have not been described for limiting purposes.

What is claimed is:

1. A vehicle comprising:
    a sensor unit;
    a communication unit configured to communicate with a neighboring vehicle; and
    a control unit configured to determine first position information of the vehicle on the basis of information acquired by the sensor unit, to receive second position information of the vehicle determined by the neighboring vehicle, and to determine that at least one of the vehicle or the neighboring vehicle is in a failure state when a difference between the first position information and the second position information exceeds a first reference value.

2. The vehicle of claim 1, wherein the communication unit is configured to communicate with the neighboring vehicle and another neighboring vehicle, and
    wherein the control unit is configured to:
    receive third position information of the vehicle determined by the other neighboring vehicle;
    determine expected position information of the vehicle on the basis of the second position information and the third position information; and
    determine the vehicle to be in a failure state when a difference between the expected position information and the first position information exceeds a second reference value.

3. The vehicle of claim 2, wherein the control unit determines expected position information of the vehicle on the basis of the first position information and the third position information and determines the neighboring vehicle to be in a failure state when a difference between the expected position information and the second position information of the vehicle exceeds a third reference value.

4. The vehicle of claim 3, wherein the control unit controls the vehicle to avoid the neighboring vehicle when the neighboring vehicle is determined to be in a failure state.

5. The vehicle of claim 3, wherein the control unit transmits a warning message to the neighboring vehicle when the neighboring vehicle is determined to be in a failure state.

6. The vehicle of claim 1, wherein the sensor unit includes a plurality of sensors, and
    wherein the control unit determines the first position information on the basis of pieces of information acquired by the plurality of sensors, respectively, and determines a failure state of at least one sensor of the plurality of sensors on the basis of the difference between the first position information and the second position information.

7. The vehicle of claim 6, wherein the control unit is configured to, upon determining that at least one of the plurality of sensors is in a failure state, control the vehicle to travel on the basis of information acquired by the sensor unit excluding the at least one sensor.

8. The vehicle of claim 1, wherein the control unit changes the first reference value on the basis of a reception strength of the communication unit and an operation state of the sensor unit.

9. A method of controlling a vehicle, the method comprising:
    communicating with a neighboring vehicle;

determining first position information of the vehicle on the basis of information acquired by a sensor unit;

receiving second position information of the vehicle determined by the neighboring vehicle; and determining that at least one of the vehicle or the neighboring vehicle is in a failure state when a difference between the first position information and the second position information exceeds a first reference value.

10. The method of claim 9, further comprising communicating with the neighboring vehicle and with another neighboring vehicle.

11. The method of claim 10, further comprising:

receiving third position information of the vehicle determined by the other neighboring vehicle;

determining expected position information of the vehicle on the basis of the second position information and the third position information; and determining that the vehicle is in a failure state when a difference between the expected position information and the first position information exceeds a second reference value.

12. The method of claim 11, wherein the determining that the vehicle is in a failure state includes:

receiving third position information of the vehicle determined by the other neighboring vehicle;

determining expected position information of the vehicle on the basis of the second position information and the third position information; and determining that the vehicle is in a failure state when a difference between the expected position information and the first position information exceeds a second reference value.

13. The method of claim 11, wherein the determining that the vehicle is in a failure state further includes:

determining expected position information of the vehicle on the basis of the first position information and the third position information; and determining that the neighboring vehicle is in a failure state when a difference between the expected position information and the second position information of the vehicle exceeds a third reference value.

14. The method of claim 9, wherein the sensor unit includes a plurality of sensors.

15. The method of claim 14, wherein the determining that at least one of the vehicle or the neighboring vehicle is in a failure state includes:

determining the first position information on the basis of pieces of information acquired by the plurality of sensors, respectively; and determining a failure state of at least one sensor of the plurality of sensors on the basis of the difference between the first position information and the second position information.

16. The method of claim 9, further comprising changing the first reference value on the basis of a reception strength of the communication unit and an operation state of the sensor unit.

17. A vehicle comprising:

a sensor unit;

a communication unit configured to communicate with a neighboring vehicle;

a processor; and a non-transitory computer-readable medium containing computer-executable instructions that, when executed by the vehicle, cause the processor to:

determine first position information of the vehicle on the basis of information acquired by the sensor unit;

receive second position information of the vehicle determined by the neighboring vehicle; and determine that at least one of the vehicle or the neighboring vehicle is in a failure state when a difference between the first position information and the second position information exceeds a first reference value.

* * * * *